(12) United States Patent
Guo

(10) Patent No.: US 6,751,713 B1
(45) Date of Patent: Jun. 15, 2004

(54) METHOD AND SYSTEM FOR SCHEDULED ACTIVATION OF SYSTEM INFORMATION TABLES IN DIGITAL TRANSPORT STREAMS

(75) Inventor: Zicheng Guo, San Diego, CA (US)

(73) Assignees: Sony Corporation, Tokyo (JP); Sony Electronics, Park Ridge, NJ (US)

( * ) Notice: Subject to any disclaimer, the term of this patent is extended or adjusted under 35 U.S.C. 154(b) by 749 days.

(21) Appl. No.: 09/588,041

(22) Filed: Jun. 5, 2000

(51) Int. Cl.$^7$ .............................................. G06F 12/00
(52) U.S. Cl. ...................................... 711/156; 725/143
(58) Field of Search ................................ 711/154, 156, 711/167; 345/555, 530; 725/136, 137, 142, 143, 131, 139, 151

(56) References Cited

U.S. PATENT DOCUMENTS

| | | | |
|---|---|---|---|
| 5,600,378 A | * 2/1997 | Wasilewski | 348/461 |
| 6,111,612 A | * 8/2000 | Ozkan et al. | 348/465 |
| 6,215,530 B1 | * 4/2001 | Wasilewski | 348/387.1 |
| 6,223,347 B1 | * 4/2001 | Watanabe et al. | 725/139 |

OTHER PUBLICATIONS

"Amendment No. 1 To ATSC Standard: Program and System Information Protocol For Terrestrial Broadcast and Cable"" *Advanced Television Systems Committee* (1999) pp. 1–7.

"ATSC Digital Television Standard" *Advanced Television Systems Committee* (1995) pp. 1–64.

"Information Technology—Generic Coding Of Moving Pictures And Associated Audio: Systems Recommendation H.222.0." *ISO/IEC* (1994) pp. 1–149.

"Program And System Information Protocol For Terrestrial Broadcast and Cable" *Advanced Television Systems Committee* (1977) pp. 1–93.

* cited by examiner

*Primary Examiner*—Matthew Kim
*Assistant Examiner*—Matthew D. Anderson
(74) *Attorney, Agent, or Firm*—Mayer Fortkort & Williams, PC; Karin L. Williams, Esq

(57) ABSTRACT

A method and system for decoding a transport stream are disclosed. In one embodiment, the method includes receiving a system information table in the transport stream, reading an activation time from the system information table, storing the table in a memory without activating values contained in the system information table, determining when the activation time is reached, and activating the values contained in the system information table when the activation time is reached. An advantage of the present invention is that the program and system information tables can be transmitted less frequently and still allow the receiver to execute the acquired "next" tables in a timely manner, once the tables have been received for the first time and their activation times have arrived. Another advantage of the present invention is its backward compatibility with the existing protocol formats, because the present invention requires no syntactic modification to the existing table formats.

3 Claims, 4 Drawing Sheets

| Syntax | Bits | Format |
|---|---|---|
| cable_virtual_channel_table_section () { | | |
|     table_id | 8 | 0xC9 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0; i<num_channels_in_section;i++) { | | |
|         short_name | 7*16 | unicode™ BMP |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         path_select | 1 | bslbf |
|         out_of_band | 1 | bslbf |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for(i=0;i<N;i++) { | | |
|             descriptors() | | |
|         } | | |
|     } | | |
|     reserved | 6 | '111111' |
|     additional_descriptors_length | 10 | uimsbf |
|     for(j=0;j<N;j++) { | | |
|         additional_descriptors() | | |
|     } | | |
|     CRC_32 | 32 | rpchof |
| } | | |

FIG. 2

| Syntax | Bits | Format |
|---|---|---|
| activation_time_descriptor(){ | | |
|     descriptor_tag | 8 | uimsbf |
|     descriptor_length | 8 | uimsbf |
|     activation_time | 32 | uimsbf |
| } | | |

FIG. 3

METHOD AND SYSTEM FOR SCHEDULED ACTIVATION OF SYSTEM INFORMATION TABLES IN DIGITAL TRANSPORT STREAMS

TECHNICAL FIELD OF THE INVENTION

The present invention relates to the decoding of digital transport streams such as MPEG-2 bitstreams, and in particular to a method and system for scheduled activation of system information tables in transport streams.

BACKGROUND OF THE INVENTION

In digital television systems or services, such as those compliant with the ATSC Digital Television Standard and/or MPEG-2 protocols, tables containing various program and system information form part of the transport stream. One such table is a "virtual channel table" (in ATSC nomenclature), also known as a channel map. This channel map provides information regarding major and minor channel numbers, carrier frequencies, program numbers and other useful information for all of the virtual channels supported by the system. The virtual channel table syntax includes a "current_next_indicator," which indicates whether the channel map being provided is currently valid or will become valid "next" (i.e. once the currently valid channel map is no longer valid). Other program and system information tables also include a "current_next_indicator."

When a channel map or other table is to be valid "next," the receiver cannot anticipate when the table will become "current." As a result, when the table becomes "current," it must be processed immediately in real time by the receiver. In order for channel map changes and other table changes to be reflected quickly at the receiver, the tables must be transmitted in the transport stream as frequently as possible, consuming valuable bandwidth in the transport stream. For channel maps in particular, this problem becomes more significant as increasing numbers of channels must be described in the channel maps. The channel maps must be transmitted along with a large amount of other program data such as program titles, descriptions, schedules, categories and ratings, as well as the packetized elementary streams containing audio and video data, all of which compete for the limited available bandwidth.

SUMMARY OF THE INVENTION

Therefore, a need has arisen for a method and system for handling system information tables that address the disadvantages and deficiencies of the prior art. In particular, a need has arisen for a method and system for scheduled activation of system information tables in transport streams.

Accordingly, a method for decoding a transport stream is disclosed. In one embodiment, the method includes receiving a system information table in the transport stream, reading an activation time from the system information table, storing the table in a memory without activating values contained in the system information table, determining when the activation time is reached, and activating the values contained in the system information table when the activation time is reached.

A transport stream reception system is also disclosed. In one embodiment, the system includes a receiver with a memory for storing data. The receiver also has a decoder that receives a system information table in a transport stream, reads an activation time from the system information table, stores the table in the memory without activating values contained in the system information table, determines when the activation time is reached, and activates the values contained in the system information table when the activation time is reached.

An advantage of the present invention is that the program and system information tables can be transmitted less frequently and still allow the receiver to execute the acquired "next" tables in a timely manner, once the tables have been received for the first time and their activation times have arrived. Another advantage of the present invention is its backward compatibility with the existing protocol formats. This is because the present invention requires no syntactic modification to the existing table formats. Instead, a new descriptor, called activation_time_descriptor( ), is defined for inclusion in those tables that actually utilize the current_next_indicator_ to aid the processing in the receiver, such as channel tuning. As a result, the descriptor can be discarded by the receivers that do not recognize it.

BRIEF DESCRIPTION OF THE DRAWINGS

For a more complete understanding of the present invention and for further features and advantages, reference is now made to the following description taken in conjunction with the accompanying drawings, in which:

FIG. 2 is an illustration of a Cable Virtual Channel Table used in accordance with the present invention;

FIG. 3 is a table illustrating an activation_time_ descriptor for use in the Cable Virtual Channel Table.

DETAILED DESCRIPTION OF THE INVENTION

Figure 1:
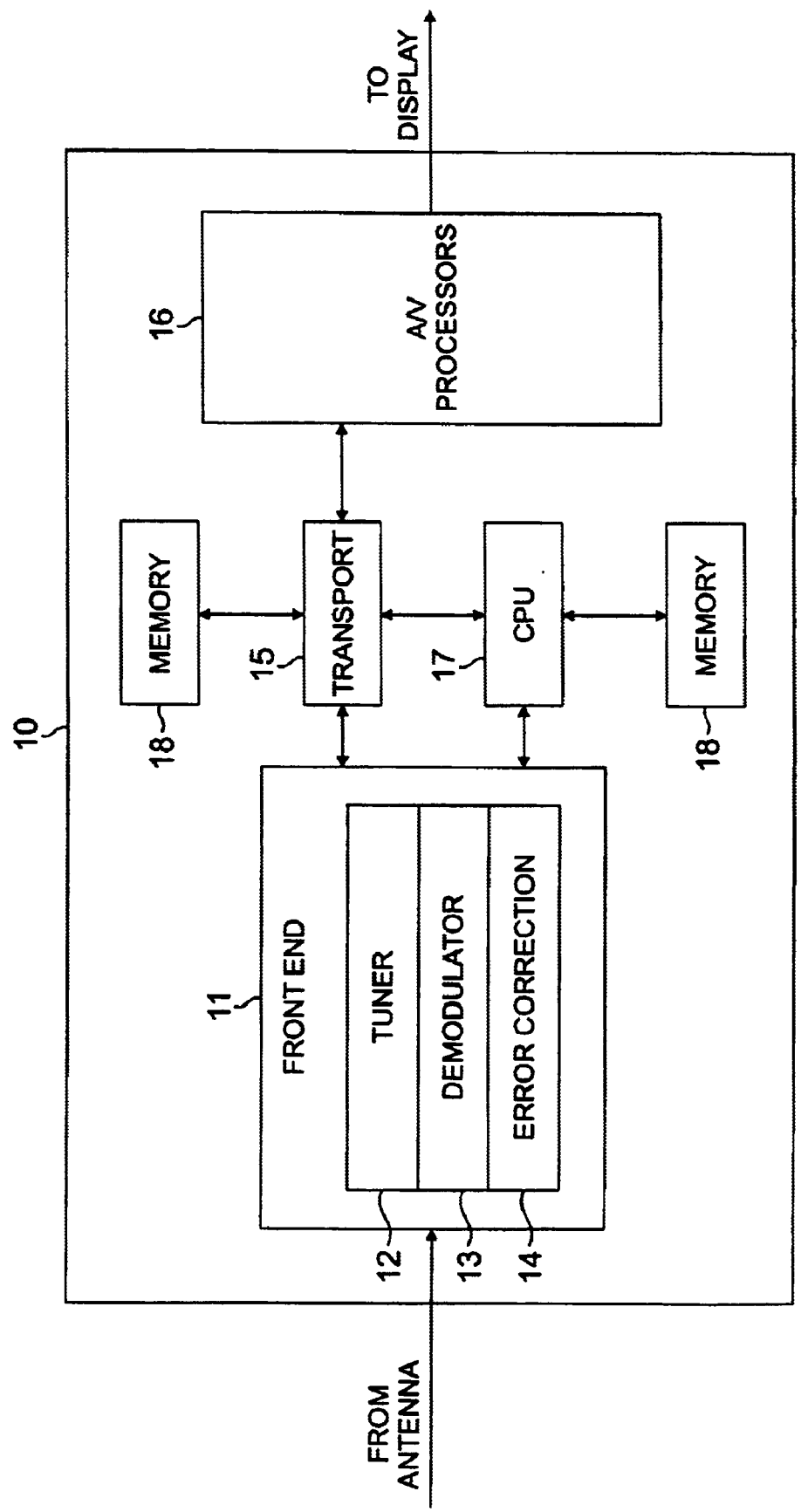
FIG. 1 is an illustration of an integrated receiver/decoder.

The preferred embodiments of the present invention and their advantages are best understood by referring to FIGS. 1, 2 and 3 of the drawings. Like numerals are used for like and corresponding parts of the various drawings.

Referring to FIG. 1, a block diagram of an integrated receiver/decoder 10 is shown. Receiver/decoder 10 includes a front end block 11 which receives an incoming RF signal from an antenna (not shown). Front end block 11 includes a tuner 12 for tuning to the desired frequency, a demodulator 13 for demodulating the RF signal and an error correction block 14 for correcting errors in the demodulated signal. The demodulated signal is provided to a transport unit 15, which acts as a demultiplexer. Transport unit 15 provides audio and video data to an audio/video processing system 16, which processes the audio and video data and provides audio and video output to a monitor or other presentation system (not shown). Transport unit 15 provides other data such as program and system information tables to a central processing unit (CPU) 17, which takes appropriate action in response to the data. A memory 18, which may comprise various RAM and ROM memory units, may be used by CPU 17 and transport unit 15 to store received data as needed. As will be seen, memory 18 may be used to store a Virtual Channel Table for future use by receiver/decoder 10.

Demodulator 13 is designed to decode an ATSC/MPEG-2 transport stream such as that described in the ATSC standard entitled "Program and System Information Protocol for Terrestrial Broadcast and Cable," Doc. A/65, Dec. 23, 1997 (hereinafter, "ATSC A/65"), which is incorporated herein by reference in its entirety, as amended by "Amendment No. 1 to ATSC Standard: Program and System Information Protocol for Terrestrial Broadcast and Cable," Doc. A/67, Dec. 17, 1999 (hereinafter, "ATSC A/67"), which is incorporated herein by reference in its entirety.

In accordance with the MPEG-2 standard (known as ISO/IEC 13818-1), the transport stream received by decoder block 16 includes program and system information in the form of tables. Examples of program and system information tables include program association tables, program map tables, conditional access tables and "private" tables with unspecified content. ATSC A/65 and A/67 provide formats for various "private" tables to carry additional program and system information. Such "private" tables include terrestrial and cable virtual channel tables.

Each one of the aforementioned program and system information tables specified by ISO/IEC 13818-1 and ATSC A/65 and A/67 includes a "current_next_indicator" field, which indicates whether the table is currently valid or will become valid "next." However, when such a conventional table is to be valid "next," a receiver cannot anticipate when the table will become "current," giving rise to the difficulties outlined above. Accordingly, a new activation_time_descriptor is defined herein for carriage in these program and system information tables to address this problem.

Referring to FIG. 2, a Cable Virtual Channel Table 20 adopted from ATSC A/65 and A/67 in accordance with the present invention is shown. Cable Virtual Channel Table 20 has a number of fields that correspond to fields specified in ATSC A/65 and A/67. As will be described more fully below, Cable Virtual Channel Table 20 includes a novel descriptor ("activation_time_descriptor") among the "additional descriptors" specified by ATSC A/65 and A/67.

The number of bits and format for each field of Cable Virtual Channel Table 20 are set forth in FIGS. 2 and 3. In accordance with ATSC A/65 and A/67 and MPEG-2 protocol, the format code "bslbf" indicates a bit string, left bit first. The format code "uimsbf" indicates an unsigned integer, most significant bit first. The format code "rpchof" indicated remainder polynomial coefficients, highest order first.

The "table_id" field of Cable Virtual Channel Table 20 (FIG. 2) carries a value (0xC9) which identifies the table as a Cable Virtual Channel Table in accordance with ATSC A/65 and A/67. The "section_syntax_indicator," "private_indicator," "section_length" and "transport_stream_id" fields are defined in accordance with ATSC A/65 and A/67, and will not be described further herein.

The "version_number" field is a five-bit field carrying the version number of Cable Virtual Channel Table 20. For the "current" Virtual Channel Table (VCT) (current_next_indicator=1), the version number is incremented by 1 whenever the definition of the current VCT changes. For the "next" VCT (current_next_indicator=0), the version number is one unit more than that of the "current" VCT.

The "current_next_indicator" field is a one-bit field in which a "1" indicates that Cable Virtual Channel Table 20 is currently applicable. If the bit is set to "0," Cable Virtual Channel Table 20 is not yet applicable, but will be the next table to become valid. This value also determines the treatment given to the "activation_time" field, as described below.

The "section_number" and "last_section_number" fields are defined in accordance with ATSC A/65 and A/67, and will not be described further herein.

The "protocol_version" field is an eight-bit unsigned integer representing the protocol version of which Cable Virtual Channel Table 20 forms a part. A protocol version value of zero is used for conventional ATSC-specified tables. Because the protocol described herein is modified from that described in ATSC A/65 and A/67, the protocol_version value for Cable Virtual Channel Table 20 may be any non-zero value such as, for example, one.

The "num_channels_in_section" field and the following fields specified for each channel are defined in accordance with ATSC A/65 and A/67, and will not be described further herein. Likewise, the "additional_descriptors_length" and "additional_descriptors" fields are defined in accordance with ATSC A/65 and A/67.

In accordance with the present invention, an "activation_time_descriptor" is implemented as one of the "additional_descriptors" of Cable Virtual Channel Table 20. The "activation_time_descriptor" specifies when Cable Virtual Channel Table 20 will become current, in the case where current_next_indicator=0.

Referring to FIG. 3, a table illustrating an activation_time_descriptor is shown. The activation_time_descriptor defines a 32-bit activation time, which is the time when a program and system information table becomes current, as specified below. Note that an activation time can be defined in many cases because changes to the program and system information tables are pre-scheduled. For example, when the same channel number is shared by two program sources, such as "CNNfn" and "Country Television Network," the time to switch from one program source to the other is known in advance. This is also the case when a new service is scheduled to go online or an existing service is scheduled to stop.

In FIG. 3, the "descriptor_tag" field identifies this descriptor as an activation_time_descriptor. The actual value of the descriptor_tag may be chosen by individual system designers to meet their system requirements. The descriptor_tag may, for example, have a value selected from the range of 0xC0 through 0xFF, which is in harmonization with ATSC A/65 and A/67, SCTE DVS 234 (Service Information Carried Out-Of-Band for Digital Cable Television), and DVB SI (Digital Video Broadcast; Specification for Service Information in DVB System).

The "descriptor_length" field specifies the number of bytes immediately following the descriptor_length field up to the end of the descriptor. The "activation_time" field is a 32-bit unsigned integer representing the activation time of Cable Virtual Channel Table 20 as a number of Global Positioning System (GPS) seconds from the from the epoch start time of 12:00 am, Jan. 6, 1980.

The activation_time_descriptor shown in FIG. 3 is to be carried as a top-level descriptor in program and system information tables, including (but not limited to) virtual channel tables such as Cable Virtual Channel Table 20 shown in FIG. 2. As previously stated, the activation_time_descriptor may be placed in the additional_descriptors loop immediately preceding the CRC_32 field of Cable Virtual Channel Table 20.

Figure 4:
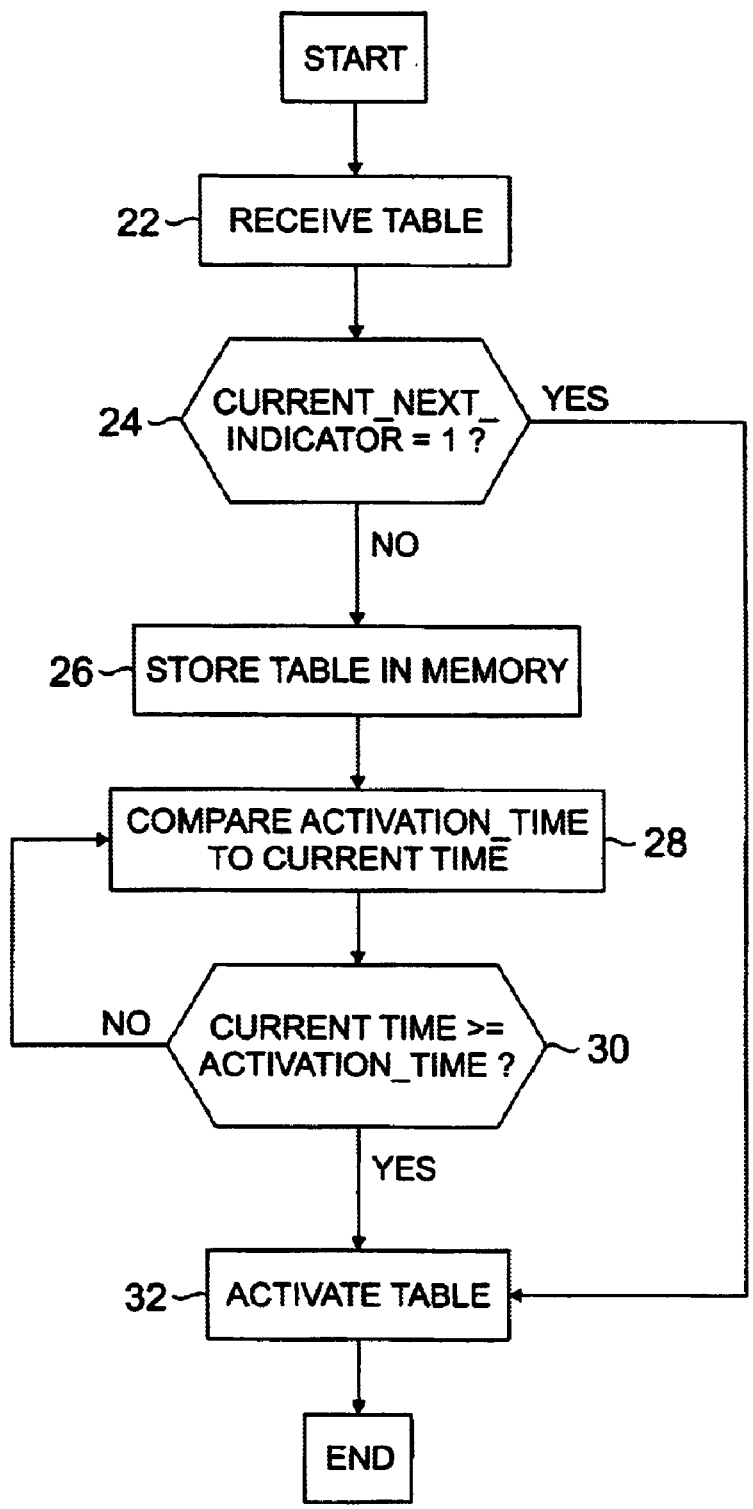
FIG. 4 is a flowchart illustrating a method for activating the Cable Virtual Channel Table in the receiver/decoder.

Referring to FIG. 4, a flowchart illustrating a method for activating Cable Virtual Channel Table 20 by receiver 14 is shown. The method begins at step 22, when receiver 14 receives Cable Virtual Channel Table 20 in the transport stream. In the normal course of decoding, decoder 16 determines from the "table_id" field that the table 20 is a Cable Virtual Channel Table. At step 24, decoder 16 examines the "current_next_indicator" field. If the field has a value of 1, indicating that Cable Virtual Channel Table 20 is "current," then the table is activated immediately as the current Cable Virtual Channel Table at step 32.

If the "current_next_indicator" field has a value of 0, indicating that Cable Virtual Channel Table 20 is "next," then the method proceeds to step 26, where Cable Virtual Channel Table 20 is stored in memory 18 for future activation. At step 28, the "activation_time" field of the activation_time_descriptor is compared to the current clock time kept by receiver 14. If, at step 30, it is determined that the two times do not match (i.e. if the "activation_time" is later than the current time), then receiver 14 returns to step 28, where the two times are again compared. This comparison step is repeated, at intervals determined by the available processor time in decoder 16, until the "activation_time" arrives (i.e. the "activation_time" is the same as or earlier than the current time). At that point, Cable Virtual Channel Table 20 is activated as the current Cable Virtual Channel Table at step 32, and the method ends.

It will be appreciated that the above-described method for activating Cable Virtual Channel Table 20 eliminates the need to periodically resend the "next" Cable Virtual Channel Table in the transport stream. Sending the "next" Cable Virtual Channel Table once is sufficient to ensure that the table is activated at the appropriate time by receiver 14. Of course, it will be understood that the same method may be used for the activation of other system information tables, and is not limited to the Cable Virtual Channel Table.

It will be understood that the activation_time_descriptor may not be useful in all types of program and system information tables. For example, the Event Information Table defined in ATSC A/65 is used to inform a user of, among other things, the start times and titles of events available on television channels, and most of these events will occur in the future. In fact, in accordance with ATSC A/65, the current_next_indicator of an Event Information Table is always set to '1,' indicating that the Event Information Table is always currently applicable.

In general, the activation_time_descriptor may be useful in program and system information tables that are transmitted in advance but are not applicable until a predetermined future time. For unexpected sudden parameter changes, the current_next_indicator may still be used as specified in ATSC A/65. Together with the current_next_indicator, the activation_time_descriptor allows the receivers to know in advance when to begin using a next program and system information table. Obviously, a previously defined activation_tme may be updated as necessary, and the revised value will be sent to and used by the receiver to override the old one.

Although the present invention and its advantages have been described in detail, it should be understood that various changes, substitutions, and alterations can be made therein without departing from the spirit and scope of the invention as defined by the appended claims.

I claim:

1. A method for decoding a transport stream, comprising
receiving a system information table in the transport stream;
reading an activation time from the system information table;
storing the table in a memory without activating values contained in the system information table;
determining when the activation time is reached; and
activating the values contained in the system information table when the activation time is reached,
wherein the system information table comprises a Virtual Channel Table, and further wherein the transport stream transmits each Virtual Channel Table only once.

2. The method of claim 1, wherein determining when the activation time is reached comprises:
comparing a current time to the activation time; and
determining when the current time equals or is greater than the activation time.

3. The method of claim 1, further comprising:
reading a current/next indicator from the table;
activating the values contained in the table in response to a first value of the current/next indicator;
wherein the step of storing the table in a memory without activating the values contained in the table is performed in response to a second value of the current/next indicator.

* * * * *